US 9,083,541 B1
Jul. 14, 2015

(54) RETRANSMITTING LOST PACKETS FOR MULTICAST DATA DISTRIBUTION

(75) Inventors: Gregory P. Olsen, Lindon, UT (US); Alan B. Butt, Orem, UT (US)

(73) Assignee: Crimson Corporation, Dover, DE (US)

( * ) Notice: Subject to any disclaimer, the term of this patent is extended or adjusted under 35 U.S.C. 154(b) by 1051 days.

(21) Appl. No.: 12/979,725

(22) Filed: Dec. 28, 2010

Related U.S. Application Data

(60) Provisional application No. 61/368,963, filed on Jul. 29, 2010.

(51) Int. Cl.
*H04L 12/28* (2006.01)
*H04L 12/18* (2006.01)
*H04L 12/761* (2013.01)

(52) U.S. Cl.
CPC ............... *H04L 12/185* (2013.01); *H04L 45/16* (2013.01)

(58) Field of Classification Search
CPC ............................... H04L 12/185; H04L 45/16
USPC .................................................. 370/228–503
See application file for complete search history.

(56) References Cited

U.S. PATENT DOCUMENTS

| | | | | |
|---|---|---|---|---|
| 5,754,754 A * | 5/1998 | Dudley et al. | ............ | 714/18 |
| 5,918,002 A * | 6/1999 | Klemets et al. | ............ | 714/18 |
| 6,052,733 A * | 4/2000 | Mahalingam et al. | ........ | 709/235 |
| 6,105,064 A * | 8/2000 | Davis et al. | ............ | 709/224 |
| 6,105,151 A * | 8/2000 | Mahalingam et al. | .......... | 714/48 |
| 6,134,678 A * | 10/2000 | Mahalingam et al. | .......... | 714/48 |
| 6,154,463 A * | 11/2000 | Aggarwal et al. | ............. | 370/408 |
| 6,208,616 B1 * | 3/2001 | Mahalingam et al. | ........ | 370/216 |
| 6,253,334 B1 * | 6/2001 | Amdahl et al. | ............... | 714/4.12 |
| 6,269,080 B1 * | 7/2001 | Kumar | ............ | 370/236 |
| 6,314,525 B1 * | 11/2001 | Mahalingham et al. | ...... | 714/4.12 |
| 6,570,843 B1 * | 5/2003 | Wolfgang | ............. | 370/216 |
| 6,748,447 B1 * | 6/2004 | Basani et al. | ................. | 709/244 |
| 6,917,985 B2 * | 7/2005 | Madruga et al. | ............. | 709/238 |
| 6,993,587 B1 * | 1/2006 | Basani et al. | ................. | 709/229 |
| 7,099,289 B2 * | 8/2006 | Varma | ............ | 370/278 |
| 7,337,316 B1 * | 2/2008 | Evans et al. | ................... | 713/162 |
| 7,360,084 B1 * | 4/2008 | Hardjono | .............. | 713/163 |
| 7,444,425 B2 * | 10/2008 | Lehmann et al. | ............. | 709/238 |
| 7,533,184 B2 * | 5/2009 | Miller et al. | ................. | 709/236 |
| 7,593,353 B2 * | 9/2009 | Liu et al. | ....................... | 370/256 |
| 7,624,423 B1 * | 11/2009 | Eatough | ........................... | 726/1 |
| 7,768,928 B2 * | 8/2010 | Harel et al. | ................. | 370/241.1 |
| 7,814,208 B2 * | 10/2010 | Stephenson et al. | ......... | 709/227 |
| 7,856,001 B2 * | 12/2010 | Hares et al. | ................... | 370/338 |
| 7,978,718 B2 * | 7/2011 | Farinacci et al. | ............. | 370/408 |
| 8,040,824 B2 * | 10/2011 | Liu et al. | ....................... | 370/256 |

(Continued)

*Primary Examiner* — Nicholas Sloms
(74) *Attorney, Agent, or Firm* — Austin Rapp & Hardman

(57) ABSTRACT

A computing device configured for retransmitting lost packets for multicast is described. It includes a processor and instructions in memory. It identifies data, which it begins sending via multicast. No data is resent until all the data has been sent. The computing device requests missed packet lists and waits. It adds missed packets to a map if there are replies. It determines whether there are any missed packets and resends any missed packets. Another computing device for retransmitting lost packets for multicast is described. It includes a processor and instructions in memory. It identifies data for distribution, which it begins sending via multicast. It waits to resend any data until all of the data has been sent. A missed packet indication is requested and received. The computing device updates lists of complete and incomplete target nodes. It determines and sends a peer download instruction.

30 Claims, 9 Drawing Sheets

(56) References Cited

U.S. PATENT DOCUMENTS

| | | | |
|---|---|---|---|
| 8,144,714 B1* | 3/2012 | Buchko et al. | 370/396 |
| 8,165,054 B2* | 4/2012 | Becker et al. | 370/312 |
| 8,230,010 B1* | 7/2012 | Hardjono et al. | 709/204 |
| 8,407,350 B2* | 3/2013 | Stephenson et al. | 709/227 |
| 8,442,046 B2* | 5/2013 | Roy et al. | 370/390 |
| 8,477,778 B2* | 7/2013 | Lehmann et al. | 370/390 |
| 8,599,733 B2* | 12/2013 | Rysgaard | 370/312 |
| 2001/0034793 A1* | 10/2001 | Madruga et al. | 709/238 |
| 2002/0023143 A1* | 2/2002 | Stephenson et al. | 709/218 |
| 2004/0215799 A1* | 10/2004 | Lehmann et al. | 709/230 |
| 2005/0004916 A1* | 1/2005 | Miller et al. | 707/10 |
| 2005/0021833 A1* | 1/2005 | Hundscheid et al. | 709/236 |
| 2005/0201405 A1* | 9/2005 | Liu et al. | 370/432 |
| 2006/0285529 A1* | 12/2006 | Hares et al. | 370/338 |
| 2007/0136480 A1* | 6/2007 | Stephenson et al. | 709/227 |
| 2008/0016402 A1* | 1/2008 | Harel et al. | 714/43 |
| 2008/0240118 A1* | 10/2008 | Roy et al. | 370/400 |
| 2009/0016347 A1* | 1/2009 | Lehmann et al. | 370/390 |
| 2009/0207771 A1* | 8/2009 | Lindskog et al. | 370/312 |
| 2009/0268733 A1* | 10/2009 | Liu et al. | 370/390 |
| 2010/0009685 A1* | 1/2010 | Rysgaard | 455/446 |
| 2010/0271981 A1* | 10/2010 | Zhao et al. | 370/256 |
| 2010/0322128 A1* | 12/2010 | Becker et al. | 370/312 |
| 2011/0090834 A1* | 4/2011 | Hares et al. | 370/312 |
| 2011/0235636 A1* | 9/2011 | Hsiu et al. | 370/390 |
| 2011/0317695 A1* | 12/2011 | Cai et al. | 370/390 |
| 2012/0136969 A1* | 5/2012 | Li et al. | 709/219 |

* cited by examiner

RETRANSMITTING LOST PACKETS FOR MULTICAST DATA DISTRIBUTION

RELATED APPLICATIONS

This application is related to and claims priority from U.S. Provisional Patent Application Ser. No. 61/368,963, filed Jul. 29, 2010, for "RETRANSMITTING LOST PACKETS FOR MULTICAST DATA DISTRIBUTION," which is incorporated herein by reference.

TECHNICAL FIELD

The present disclosure relates generally to computers and computer-related technology. More specifically, the present disclosure relates to re-transmitting lost packets for multicast data distribution.

BACKGROUND

Computer and communication technologies continue to advance at a rapid pace. Indeed, computer and communication technologies are involved in many aspects of a person's day. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. On a network, one or more servers may provide data, services and/or may communicate with other computers. The computers are often referred to as nodes. A computer network may have hundreds or even thousands of nodes.

Certain data may often need to be distributed to many nodes in a network. For example, a new piece of software may need to be distributed to many computers in a network. Sending a large amount of data to many network nodes may occupy a large amount of network bandwidth and processing resources.

As shown from the above discussion, there is a need for systems and methods that will improve the ability to multicast data from a computing device. Improved systems and methods may enable more efficient distribution of data to many nodes on a network. That is, the improved systems and methods disclosed herein may increase the efficiency of multicast by improving the handling of missed, dropped or lost packets.

DETAILED DESCRIPTION

Figure 1:
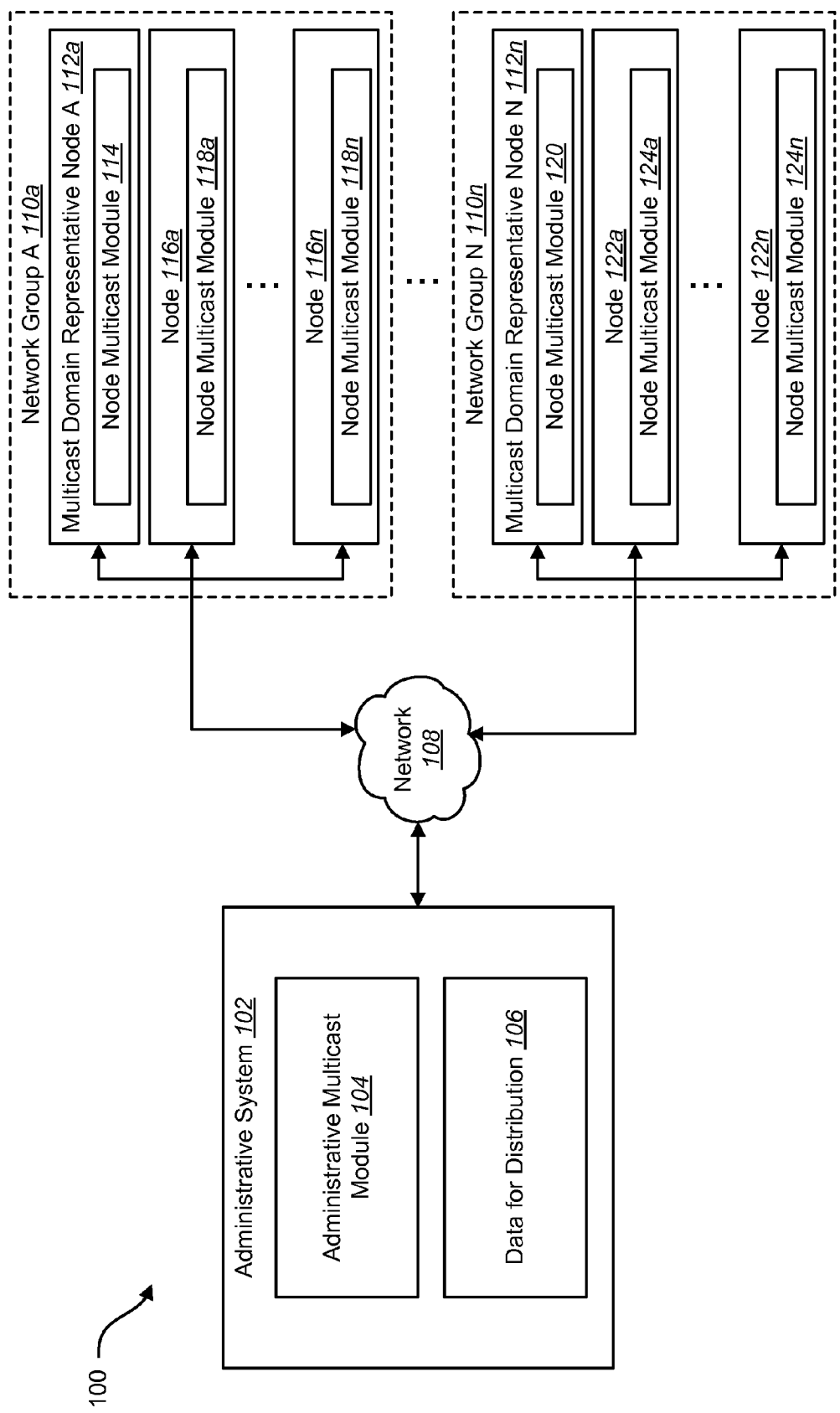
FIG. 1 is a block diagram illustrating a system in which systems and methods for retransmitting lost packets for multicast data distribution may be implemented.

There is often a need to distribute data to many computing devices in a network. For example, an updated software program may need to be distributed to many computing devices that are connected to the network of a business or organization. This may be accomplished through multicasting. Multicasting refers to a communication technique where a single computing device may send the same data to many (or even all) computing devices on a network. However, some of the data (e.g., some data packets) may be lost when sending data over the network to the computing devices. That is, some transmitted data packets may not be received by all of the receiving computing devices. For instance, some of the packets may be lost or be too damaged to recover.

In an effort to remedy these difficulties, some computing devices may request that the lost or damaged packets be resent. For example, some of the intended recipients or "target" computing devices may request retransmission as soon as they detect a missing packet. In one configuration, lost packets may be detected by using a packet number. For example, the receiving computing devices may have a known size of all packets and each packet may have an index into a file. For example, the first packet may have a packet number 0, the second packet may have a packet number 1, etc. Thus, when an index is not received, the receiving computing devices may detect a lost packet. It may be difficult to design an efficient system that resends the requested packets but does not resend them too many times. For example, if every target node or "client" computing device misses the same packets, the multicast sender could receive thousands of messages (e.g., retransmit requests) for each missed packet. Attempting to respond to each retransmit request (e.g., during a transmission) may cause the sender to slow down. Furthermore, it is possible to receive packets out of order. Thus, requesting a retransmission as soon as a missing packet was "detected" may be unnecessary and cause a multicast sender to get bogged down. The systems and methods disclosed herein may alleviate these difficulties.

In general, a first method may be used where a domain or network group representative waits to resend or retransmit any data until the initial multicast is complete. A second method may also be used where the domain or network group representative also waits to handle any retransmission until the initial multicast is complete, but instructs the target nodes to obtain any missed packet from a network peer via a peer download. Using a combination of these methods may provide a benefit of saved bandwidth, but with the reliability of peer-to-peer or connection-based downloads. This may solve a problem where a multicast job is slowed as a result of missed packets or target nodes that cannot keep up. It may also simplify multicast software and/or hardware implementations.

These methods may have further benefits. Using these methods may allow fast multicasting while efficiently getting missed data to target nodes. These methods may thus avoid slow multicasting.

A computing device that is configured for retransmitting lost packets for multicast data distribution from a computing device is disclosed. The computing device includes a processor and executable instructions stored in memory that is in electronic communication with the processor. The computing device identifies data for distribution to be distributed via a computer network and begins sending the data for distribution via multicast. The computing device additionally waits to resend any part of the data for distribution until all of the data for distribution has been sent. Furthermore, the computing device sends a request for missed packet lists. The computing device also waits for replies to the request for the missed packet lists. The computing device further adds missed packets to a map if there are replies to the request for missed packet lists. The computing device also determines whether there are any missed packets. The computing device additionally resends the missed packets if there are any missed packets. The computing device may also return to send a request for missed packet lists after resending the missed packets. Determining whether there are any missed packets may be based on whether at least one missed packet list is received by the computing device.

The computing device may also request one or more status messages if there are no missed packets and wait to receive one or more status messages if there are no missed packets. The computing device may further send the status messages if there are no missed packets.

The computing device may additionally determine whether to repeat operation. Determining whether to repeat operation may be based on a fixed number of repeats. Determining whether to repeat operation may be based on a time limit. The computing device may also return to send requests for missed packet lists if it is determined to repeat operation. The computing device may also return to resend missed packets if it is determined to repeat operation.

The computing device may also request one or more status messages if it is determined to not repeat operation and wait to receive one or more status messages if it is determined not to repeat operation. The computing device may also send the status messages if it is determined not to repeat operation.

A computing device that is configured for retransmitting lost packets for multicast data distribution from a computing device is also disclosed. The computing device includes a processor and executable instructions stored in memory that is in electronic communication with the processor. The computing device identifies data for distribution to be distributed via a computer network. The computing device also begins sending the data for distribution via multicast. The computing device further waits to resend any part of the data for distribution until all of the data for distribution has been sent. The computing device additionally requests a missed packet indication and receives a missed packet indication. Furthermore, the computing device updates a list of complete target nodes and updates a list of incomplete target nodes. The computing device also determines a peer download instruction and sends a peer download instruction. The computing device may also determine whether to continue based on a number of same missed packet indications. The missed packet indication may include a number of missed packets.

The peer download instruction may include an instruction for an incomplete target node to connect to a designated complete target node to obtain at least one missing packet. The peer download instruction may include an address of a designated complete target node.

Updating the list of complete target nodes may include adding a target node to the list corresponding to a missed packet indication of zero packets. Updating the list of incomplete target nodes may include adding a target node to the list corresponding to a missed packet indication of one or more packets. Updating the list of incomplete target nodes may include removing a target node from the list corresponding to a missed packet indication of zero packets.

A method for retransmitting lost packets for multicast data distribution from a computing device is also disclosed. The method includes identifying data for distribution to be distributed via a computer network. The method also includes beginning to send the data for distribution from a computing device via multicast. The method further includes waiting, on the computing device, to resend any part of the data for distribution until all of the data for distribution has been sent. Furthermore, the method includes sending a request for missed packet lists and waiting for replies to the request for the missed packet lists. The method also includes adding, on the computing device, missed packets to a map if there are replies to the request for missed packet lists. The method additionally includes determining, on the computing device, whether there are any missed packets and resending the missed packets if there are any missed packets.

A method that is configured for retransmitting lost packets for multicast data distribution from a computing device is also disclosed. The method includes identifying data for distribution to be distributed via a computer network and beginning to send the data for distribution via multicast. The method further includes waiting, on the computing device, to resend any part of the data for distribution until all of the data for distribution has been sent. The method additionally includes requesting a missed packet indication and receiving a missed packet indication. Furthermore, the method includes updating, on the computing device, a list of complete target nodes. The method also includes updating, on the computing device, a list of incomplete target nodes. The method additionally includes determining a peer download instruction and sending a peer download instruction.

A non-transitory tangible computer-readable medium for retransmitting lost packets for multicast data distribution on a computing device is also disclosed. The computer-readable medium includes executable instructions for identifying data for distribution to be distributed via a computer network and beginning to send the data for distribution via multicast. Executable instructions are also included on the computer-readable medium for waiting to resend any part of the data for distribution until all of the data for distribution has been sent. The computer-readable medium also includes executable instructions for sending a request for missed packet lists, waiting for replies to the request for the missed packet lists and adding missed packets to a map if there are replies to the request for missed packet lists. Executable instructions are also included on the computer-readable medium for determining whether there are any missed packets and resending the missed packets if there are any missed packets.

A non-transitory tangible computer-readable medium for retransmitting lost packets for multicast data distribution from a computing device is also disclosed. The computer-readable medium includes executable instructions for identifying data for distribution to be distributed via a computer network and beginning to send the data for distribution via multicast. Executable instructions are also included on the computer-readable medium for waiting to resend any part of the data for distribution until all of the data for distribution has been sent. The computer-readable medium further includes executable instructions for requesting a missed packet indication and receiving a missed packet indication. Executable instructions are also included on the computer-readable medium for updating a list of complete target nodes and updating a list of incomplete target nodes. The computer-readable medium also includes executable instructions for determining a peer download instruction and sending a peer download instruction.

Various configurations of the systems and methods are now described with reference to the Figures, where like reference numbers may indicate identical or functionally similar elements. The configurations of the present systems and methods, as generally described and illustrated in the Figures herein, could be arranged and designed in a wide variety of different configurations. Thus, the following more detailed description of several configurations of the present systems and methods, as represented in the Figures, is not intended to limit the scope of these systems and methods, as claimed, but is merely representative of the configurations of the systems and methods.

FIG. 1 is a block diagram illustrating a system 100 in which systems and methods for retransmitting lost packets for multicast data distribution may be implemented. An administrative system 102 is connected to a network 108. The network 108 may be a computer network such as a Local Area Network (LAN), Wide Area Network (WAN) or the Internet. Multicast domain representative nodes 112a-n and other (i.e., non-representative) nodes 116a-n, 122a-n may also be connected to the network 108. A single multicast domain representative node 112a-n and other nodes 116a-n, 122a-n may be grouped or divided into network groups 110a-n. For example, a network group A 110a includes a multicast domain representative node A 112a and several other nodes 116a-n. Another network group N 110n may also include a multicast domain representative node N 112n and other nodes 122a-n. Network groups 110 may be delineated, for example, according to Local Area Networks (LANs) or subnets of a larger network. In one configuration, for example, there may be a multicast domain representative node 112 on each subnet. This could allow a network to gain the benefits of multicast without having to configure the network (e.g., routers) to route multicast packets. Instead, a multicast domain representative node 112 on each subnet could handle multicast functionality for that subnet. It was discovered, for example, that multiple subnets could sometimes see multicast traffic from each other (even if packets were set to only go one hop, for example). Thus, in one configuration, a "domain" may mean a group of subnets that can see each other's multicast traffic. In one configuration, a network group 110 may be a "domain." These "domains" may be discovered and all of the subnets that can see the same multicast traffic. These subnets may be grouped by domain, with a single node (e.g., computing device) being selected as a representative for each domain (e.g., a multicast domain representative node 112). This may avoid the problem of having more than one representative sending the same file via multicast. Thus, a network group 110 may be a subnet, a group of subnets and/or a group of nodes 112, 116, 122, depending on the configuration.

The administrative system 102 may include an administrative multicast module 104. The administrative multicast module 104 may be a software and/or hardware module used to distribute data for distribution 106 to the nodes 112a-n, 116a-n, 122a-n included in the network groups 110a-n. The data for distribution 106 may be data that is desired to be sent to one or more of the nodes 112a-n, 116a-n, 122a-n on the network 108. Examples of data for distribution 106 include software files (e.g., applications, programs, drivers, etc.) or data (e.g., data files, image files, audio files, video files, etc.). More specifically, the data for distribution 106 might be anti-virus definitions for security software, a new word processing program, operating system updates, an image to be used as a desktop background, vulnerability scanning software, inventory scanning software or other applications or data intended for the nodes 112a-n, 116a-n, 122a-n.

As discussed above, each network group 110a-n may include a designated multicast domain representative node 112a-n. The designation of a multicast domain representative node 112 may be made using various techniques or methods. For example, the multicast domain representative nodes 112a-n could be selected by the administrative system 102 or could "volunteer" to represent the nodes 116a-n, 122a-n in their respective network groups 110a-n. For example, the multicast domain representative node A 112a is (i.e., or was) one of the "regular" nodes 116a-n included in the network group A 110a that was selected by the administrative system 102 to be a multicast domain representative node or "volunteered" to be a multicast domain representative node. This procedure could possibly occur with the administrative system 102 determining that the multicast domain representative node A 112a is capable to represent the network group A 110a and assigning it accordingly. By way of example only, the designation could be made using an automated algorithm (e.g., selecting a node 116 with the highest Internet Protocol (IP) address). Alternatively, the multicast domain representative node A 112a may have determined that a representative was lacking in the network group A 110a and designated itself (i.e., "volunteered") as the network group A 110a representative. In another configuration, the multicast domain representative node A may have responded to a request from the administrative system 102 seeking a network group A 110a representative. In yet another configuration, the designation may be made in response to user input selecting the designated node (e.g., the input of an administrator of a network group 110).

Each of the nodes 112a-n, 116a-n, 122a-n in the network groups 110a-n may include a node multicast module 114, 118a-n, 120, 124a-n. The node multicast modules 114, 118a-n, 120, 124a-n may be software and/or hardware modules used to enable multicasting (and/or retransmission) functionality. The node multicast modules 114, 118, 120, 122 may function according to the type of node 112a-n, 116a-n, 122a-n in which they are included. For example, the node multicast modules 114, 120 included in the multicast domain representative nodes 112a, 112n may perform functions that are different from and/or additional to functions performed by the node multicast modules 118a-n, 124a-n included in the "regular" nodes 116a-n, 122a-n. For example, the node multicast modules 114, 120 included in the multicast domain representative nodes 112a-n may enable sending (e.g., multicasting) and/or retransmission functionality. On the other hand, the node multicast modules 118a-n, 124a-n included in the "regular" or non-representative nodes 116a-n, 122a-n may enable missed packet logging and/or retransmission request functionality. In some configurations, the node multicast modules 118a-n, 124a-n may also enable peer download functionality. For example, each node multicast module 114, 118, 120, 124 on each of the nodes 112, 116, 122 may support multicast domain representative functionality (e.g., send data via multicast), may support data reception (e.g., enable the node to receive multicast data) and/or may support peer functionality (e.g., enable the node to provide data to other targets or nodes that did not receive all of the multicast data or file), depending on the configuration.

As mentioned above, the data for distribution 106 is identified as data to be distributed to two or more nodes 112a-n, 116a-n, 122a-n over the network 108. Rather than sending the data for distribution directly to all of the intended or "target" nodes, the administrative system 102 may instead send the data for distribution 106 to each of the multicast domain representative nodes 112a-n. The multicast domain representative nodes 112a-n may each be tasked with distributing the data for distribution 106 to all of the intended or "target" nodes in their respective network group 110a-n. These target nodes may be all or a subset of the other nodes 116a-n, 122a-n included in their respective network group 110a-n.

Figure 2:
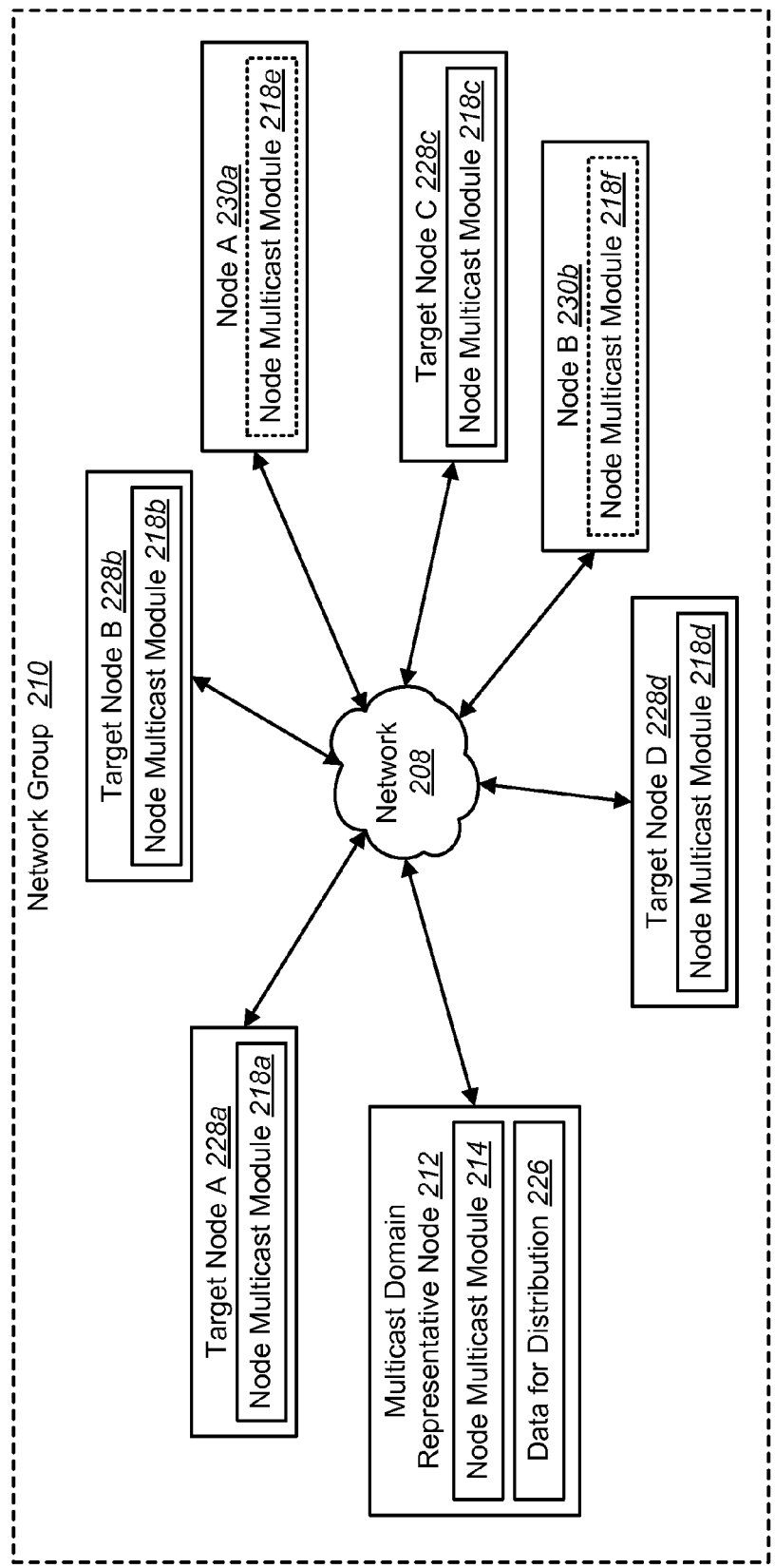
FIG. 2 is a block diagram illustrating one example of a network group.

FIG. 2 is a block diagram illustrating one example of a network group 210. A network group 210 may be grouped according to a local area network, wide area network or part of a larger network, such as a subnet. The network group 210 may include several nodes 212, 228a-d, 230a-b. The nodes 212, 228a-d, 230a-b may be similar computing devices, though they are here described as a multicast domain representative node 212, several target nodes 228a-d and other nodes 230a-b. However, in one example configuration, the multicast domain representative node 212 is a server while the target nodes 228a-d and the other nodes 230a-b are personal computers. Although only a few target nodes 228a-d and other nodes 230a-b are shown in FIG. 2, a network group 210 could include hundreds or even thousands of target nodes 228 and other nodes 230. The multicast domain representative node 212, the target nodes 228a-d and the other nodes 230a-b are interconnected via a network 208. The network 208 may allow each of the nodes 212, 228a-d, 230a-b to communicate with each other.

The multicast domain representative node 212 includes a node multicast module 214. The target nodes 228a-d also include respective node multicast modules 218a-d. The other nodes 230a-b may or may not include node multicast modules 218e-f. The multicast domain representative node 212 includes data for distribution 226 received from the administrative system 102 as discussed above. The data for distribution 226 may include one or more files, for example. The multicast domain representative node 212 may attempt to multicast the data for distribution 226 to all of the target nodes 228a-d. In one configuration, the multicast domain representative node 212 includes a target list (not shown), which is a list of target nodes 228a-d that the data for distribution 226 is intended for. The target list may include node (e.g., computing device) names and/or network (e.g., IP) addresses for all of the target nodes 228a-d and/or may omit information about the other nodes 230a-b. For example, before the actual data for distribution 226 is sent, a series of packets that may indicate all of the target nodes 228 determined (or "thought") to be on the subnet are sent. All of the nodes (e.g., computing devices) on the subnet listening to the multicast packets may use each target list message to determine whether they should "listen" or not. For instance, if a node determines that its own name is in one or more target list messages, it may "listen" (e.g., prepare to receive multicast packets). Otherwise, the node may ignore the rest of the data (e.g., multicast packets).

If packets are missed or lost during the transmission, the node multicast modules 218a-d in the target nodes 218a-d may log or keep a list of the missed packets. The other nodes 230a-b are not included in the multicast transmission. That is, the other nodes 230a-b may not receive any of the packets being sent in the multicast transmission, or they may alternatively disregard any packets that are not intended for them.

Figure 3:
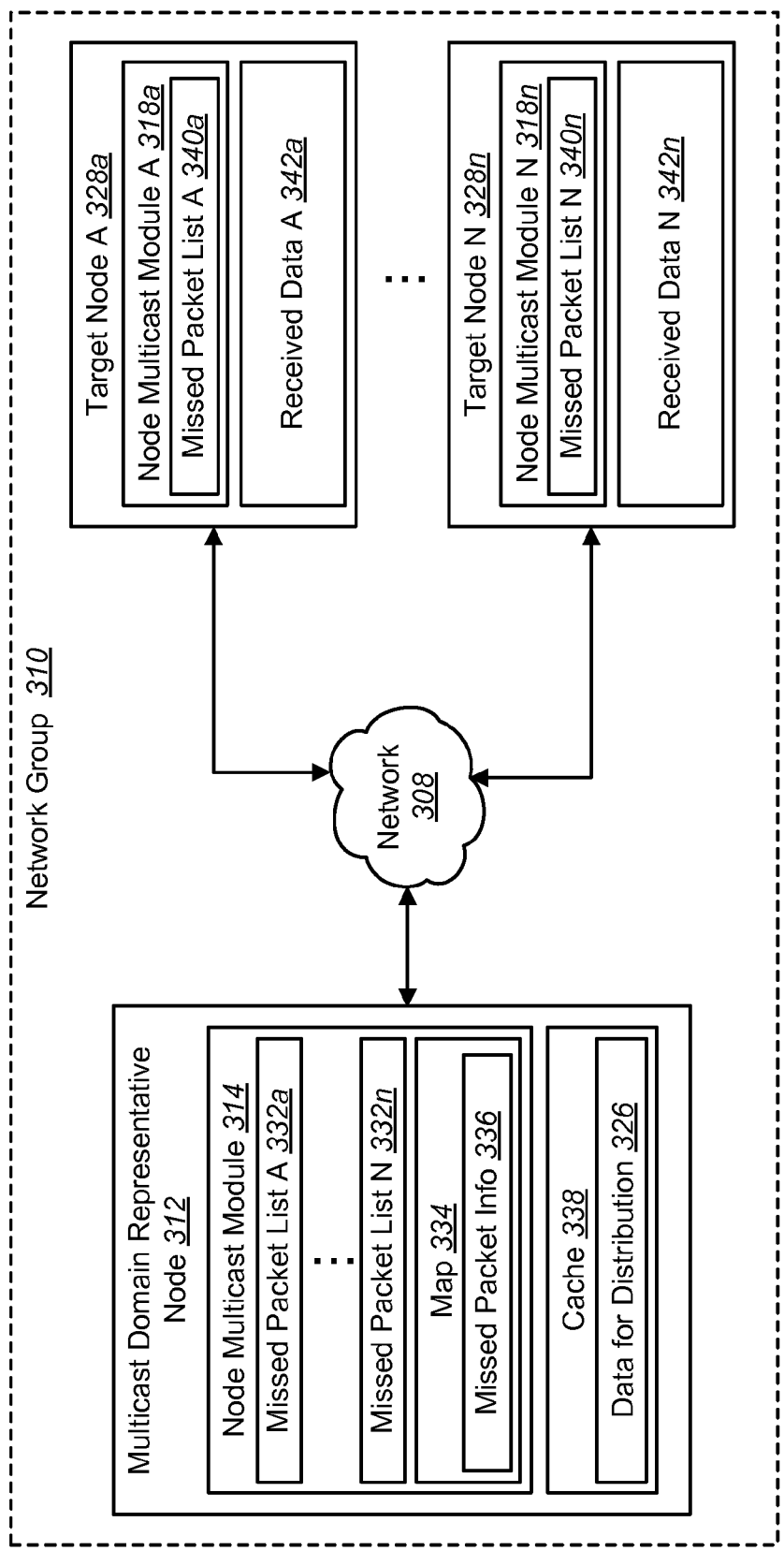
FIG. 3 is a block diagram illustrating one configuration of nodes in which systems and methods for retransmitting lost packets for multicast data distribution may be implemented.

FIG. 3 is a block diagram illustrating one configuration of nodes 312, 328a-n in which systems and methods for retransmitting lost packets for multicast data distribution may be implemented. A network group 310 may include a multicast domain representative node 312 and several target nodes 328a-n. The network 308 allows the multicast domain representative node 312 to communicate with the target nodes 328a-n and vice-versa. The multicast domain representative node 312 may include a node multicast module 314 and a cache 338. The cache 338 may include the data for distribution 326. More specifically, the data for distribution 326 could be in the cache as a result of the multicast domain representative node 312 transmitting the data for distribution 326 as part of a multicast job or task. The multicast domain representative node 312 attempts to send or multicast the data for distribution 326 to all of the target nodes 328a-n.

Each of the target nodes 328a-n may include a node multicast module 318a-n. As the data for distribution 326 is being transmitted, the target nodes 328a-n may not successfully receive some (or possibly all) of the data for distribution 326. More specifically, the target nodes 328a-n might detect that they have not successfully received some or all of the data for distribution 326. In one configuration, the target nodes 328a-n detect that a packet has been missed based on the packet number. Other detection methods may be used. For example, each packet may have a 0-based index and each packet may contain a fixed amount of data (except for the last packet, which may contain less, for example). Thus, the target nodes 328a-n may use the index and the amount of data to determine where in the one or more files the data belongs. Furthermore, a packet may be sent (before the data for distribution 326 packets) that gives file information, which may include the size of the one or more files about to be sent, such that the target nodes 328a-n may know how many packets to expect. According to the systems and methods disclosed herein, a binary map that is big enough for each packet in the one or more files may be maintained by the target nodes 328a-n. The binary map may be initialized with a "packet missing" status or indicator for each index. Each status or indicator may be set to "received" as packets are received. However, when asked by the multicast domain representative node 312 for an indication of missing packets, the target nodes 328a-n may parse the binary map and build an encoded list (e.g., missed packet lists 340a-n) of the packets that are still missing.

When packets are missed, the received data 342a-n on the target nodes 328a-n does not contain all of the data for distribution 326. As the target nodes 328a-n detect missed packets (i.e., during or after transmission), the target nodes 328a-n my keep a record of which packets were missed in missed packet lists 340a-n. The target nodes 328a-n wait to request the retransmission of any missed packets until after the multicast transmission is complete (e.g., until asked for an indication of missing packets). In this way, upstream requests will not be sent to the multicast domain representative node 312 that is sending the data, which could cause even more multicast packets to be dropped (by the network 308, for example). When the multicast transmission is complete (i.e., the multicast domain representative node 312 has sent all of the data for distribution 326 once), the multicast domain representative node 312 may send a request for missed packet lists 340a-n from target nodes 328a-n that have not received all of the data for distribution 326. The multicast domain representative node 312 may then wait for responses. The target node 328a-n may use a simple encoding of ranges of missed packets such that a message from a target node 328 may contain information indicating many or all of its missed packets. Thus, target nodes 328a-n that have detected missed packets may send their missed packet lists 340a-n to the multicast domain representative node 312.

The multicast domain representative node 312 may receive the missed packets lists 332a-n, if any. As the missed packet lists 332a-n are received, information regarding missed packets 336 may be extracted from the missed packet lists 332a-n received from the target nodes 328a-n. This missed packet information 336 (illustrated as "missed packet info" for convenience) may be placed into a map 334 by the node multicast module 314 residing on the multicast domain representative node 312. The map 334 may be used by the multicast domain representative node 312 to plan a retransmission of all of the missed packets reported by the target nodes 328a-n.

Using the map 334 may be particularly beneficial. For example, when many missed list replies are received (by the multicast domain representative node 312), the map 334 enables the multicast domain representative node 312 to process the missed list replies quickly in order to avoid missing missed packet list 332 replies. Furthermore, the multicast domain representative node 312 may handle the situation where many replies may contain the same missed packet index. For instance, the multicast domain representative node 312 may need to be efficient if 1000 machines all missed a 13$^{th}$ packet. That is, it may be inefficient to resend the same packet (e.g., the 13$^{th}$ packet) 1000 times. Thus, the map 334 may store missed packet indexes 336. The corresponding data from the data for distribution 326 may be obtained from the cache 338 directory using the index. In one configuration, the map 334 uses the index as a key. In this way, for instance, an index indicating the 13$^{th}$ packet may be added to the map 334 any number of times. However, the index indicating the 13$^{th}$ packet will only be in the map 334 once. Thus, when it is time to resend the missing packets (from the data for distribution 326, for example), the multicast domain representative node 312 may use the map 334 and send each missing packet once, even if 1000 target nodes 328 missed that packet. The multicast domain representative node 312 may then retransmit each of the packets included in the data for distribution 326 that were indicated by the missed packet information 336. In one configuration, the multicast domain representative node 312 retransmits the packets a set number of times. In another configuration, the multicast domain representative node 312 retransmits the packets indicated by the missed packet information 336, and then returns to request any missed packet lists 340a-n.

Figure 4:
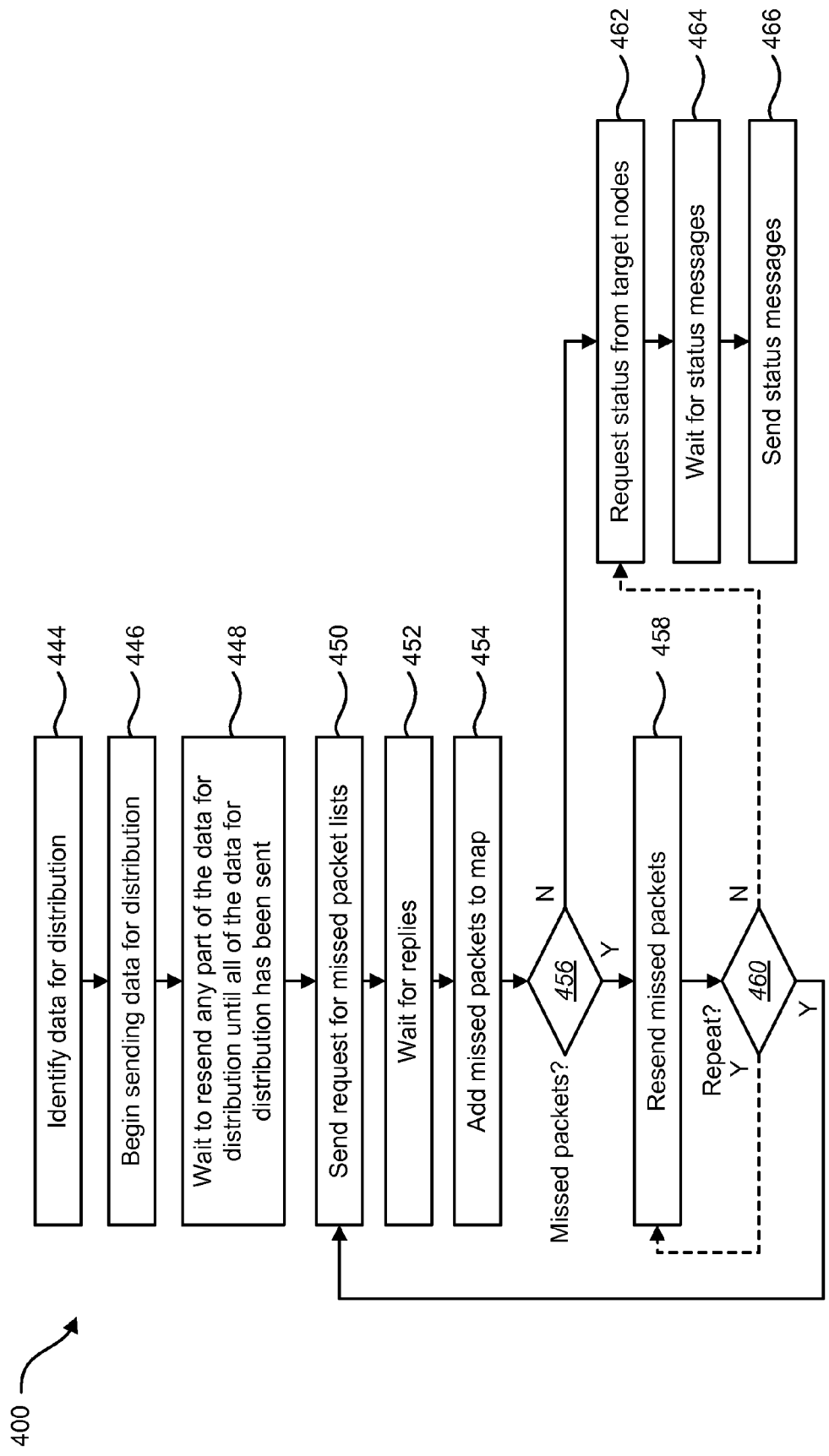
FIG. 4 is a flow diagram illustrating one configuration of a method for retransmitting lost packets for multicast data distribution.

FIG. 4 is a flow diagram illustrating one configuration of a method 400 for retransmitting lost packets for multicast data distribution. The multicast domain representative node 312 may identify 444 data for distribution 326. For example, the multicast domain representative node 312 receives data for distribution 326 from the administrative system 102. In an alternative configuration, the multicast domain representative node 312 has data for distribution 326 that is scheduled to be distributed at a certain time. The multicast domain representative node 312 then begins sending 446 the data for distribution 326 via multicast. The multicast domain representative node 312 may wait 448 to resend any part of the data for distribution 326 until all of the data for distribution 326 has been sent. For example, depending on the configuration of the node multicast modules 318a-n, the target nodes 328a-n may send retransmission requests even during the multicast transmission. In this case, the multicast domain representative node 312 waits 448 or disregards any retransmission requests until the multicast transmission is complete. In another configuration, the target nodes 328a-n simply do not send any requests for retransmission or missed packet lists 340a-n until the multicast transmission is complete (e.g., until they receive a request for missed packet lists 340a-n). In yet another configuration (when it would be desirable to avoid all of the target nodes 328 sending retransmission requests at the same time, for example), the target nodes 328 may send the retransmission requests at random times even during the multicast. In this way, the multicast domain representative node 312 may efficiently build the map 334 of missed packets 336 that it 312 may resend when the initial multicast is complete.

The multicast domain representative node 312 may then send 450 a request for missed packet lists 340a-n (i.e., bulk missed packets) to all of the target nodes 328a-n on the network group 310 (e.g., over the multicast channel). The multicast domain representative node 312 may then wait 452 for replies. The replies may include missed packet lists 340a-n. In one configuration, the multicast domain representative node 312 simply waits for a set amount of time. In another configuration, the multicast domain representative node 312 may discontinue waiting if it receives a reply from all of the target nodes 328a-n.

In one configuration, a target node 328 does not send a reply (e.g., a missed packet list 340) if it 328 is not missing any data for distribution. It should be noted that the multicast domain representative node 312 may determine which of the target nodes 328 have all of the data for distribution 326 (as received data 342) and which of the target nodes 328 are missing part of the data for distribution 326 (e.g., in order to accomplish peer completion, for example) by receiving replies from the target nodes 328 indicating how many packets are missing (e.g., "0" if a target node 328 has received all of the data for distribution 326).

In one configuration that is discussed in greater detail below, the target nodes 328 that are not missing any packets may become "peers" and the target nodes 328 missing packets may be instructed to download from a peer. The target nodes 328 missing the fewest packets may do peer completion first, such that they may receive all of the data and become available as peers as soon as possible.

While the multicast domain representative node 312 waits 452 for replies or thereafter, it may add 454 any received missed packet information 336 to the map 334. The multicast domain representative node 312 may then determine 456 whether any of the target nodes 328a-n have missed packets from the data for distribution 326. For example, the received missed packet lists 332a-n indicate whether any packets have not been successfully received by the target nodes 328a-n.

If no packets have been missed, the multicast domain representative node 312 requests 462 a status from the target nodes 328a-n. That is, the multicast domain representative node 312 may send a message to the target nodes 328a-n that instructs them to send a status message. In one configuration, the node multicast modules 318a-n included in the target nodes 328a-n receive the request for the status message. The node multicast modules 318a-n may then generate a status message. In one configuration, the status message contains information about whether the data for distribution 326 was successfully received. The status message could contain other information, such as whether a program (e.g., the data for distribution 326) was successfully installed, and if not, an error message including a reason for installation failure. For example, some reasons for failure may include not receiving all of the packets, shutting down, no room on the disk to write the whole file, etc.

The multicast domain representative node 312 may wait 464 for status messages. For example, the multicast domain representative node 312 may wait for a set amount of time and/or until it has received status messages from all of the target nodes 328a-n. The multicast domain representative node 312 may then send 466 the status messages. For example, the multicast domain representative node 312 sends the status messages to the administrative system 102.

If packets have been missed, the multicast domain representative node 312 may then resend 458 the missed packets via multicast using the map 334. This may occur after a short period of time. Once the multicast domain representative node 312 has completed resending the missed packets, it may determine 460 whether it should repeat the procedure. In a first configuration, the multicast domain representative node 312 determines that it should repeat until there are no more missed packets. That is, until all of the target nodes 328a-n have successfully received all of the data for distribution 326 or do not report any missing data. In this first configuration, the multicast domain representative node 312 relies on the determination 456 of whether there were any missed packets to finish the procedure. That is, in this first configuration, the multicast domain representative node 312 would always determine 460 that it should repeat once the process reached the repeat determination 460. At that point, the multicast domain representative node 312 returns to send 450 a request for missed packet lists 340a-n from the target nodes 328a-n.

In a second configuration, the multicast domain representative node 312 would determine 460 that the procedure should repeat for a fixed number of times. For example, the multicast domain representative node 312 may be configured to repeat the procedure five times unless no packets are missed before five repeats. In this example however, if packets are continually missed, operation would proceed to requesting 462 a status message after the fifth repeat. The multicast domain representative node 312 would wait 464 for status messages and send 466 status messages at that point.

In a third configuration, the multicast domain representative node 312 would determine 460 that it should repeat the procedure until a certain amount of time had expired. So long as packets were still missed in the missed packet determination 456, operation would continue to repeat until a time limit was passed. At that point, the multicast domain representative node 312 requests 462 status messages from target nodes 328a-n, waits 464 for status messages and sends 466 status messages.

In yet a fourth configuration, the multicast domain representative node 312 might determine 460 to simply repeat resending 458 the missed packets for a set amount of time or for a set number of times (i.e., without returning to send 450 a request for missed packet lists). When the set amount of time or set number of times expired in this fourth configuration, the multicast domain representative node 312 would request 462 a status message from the target nodes 328a-n, wait 464 to receive status messages and send 466 the status messages as described above.

Figure 5:
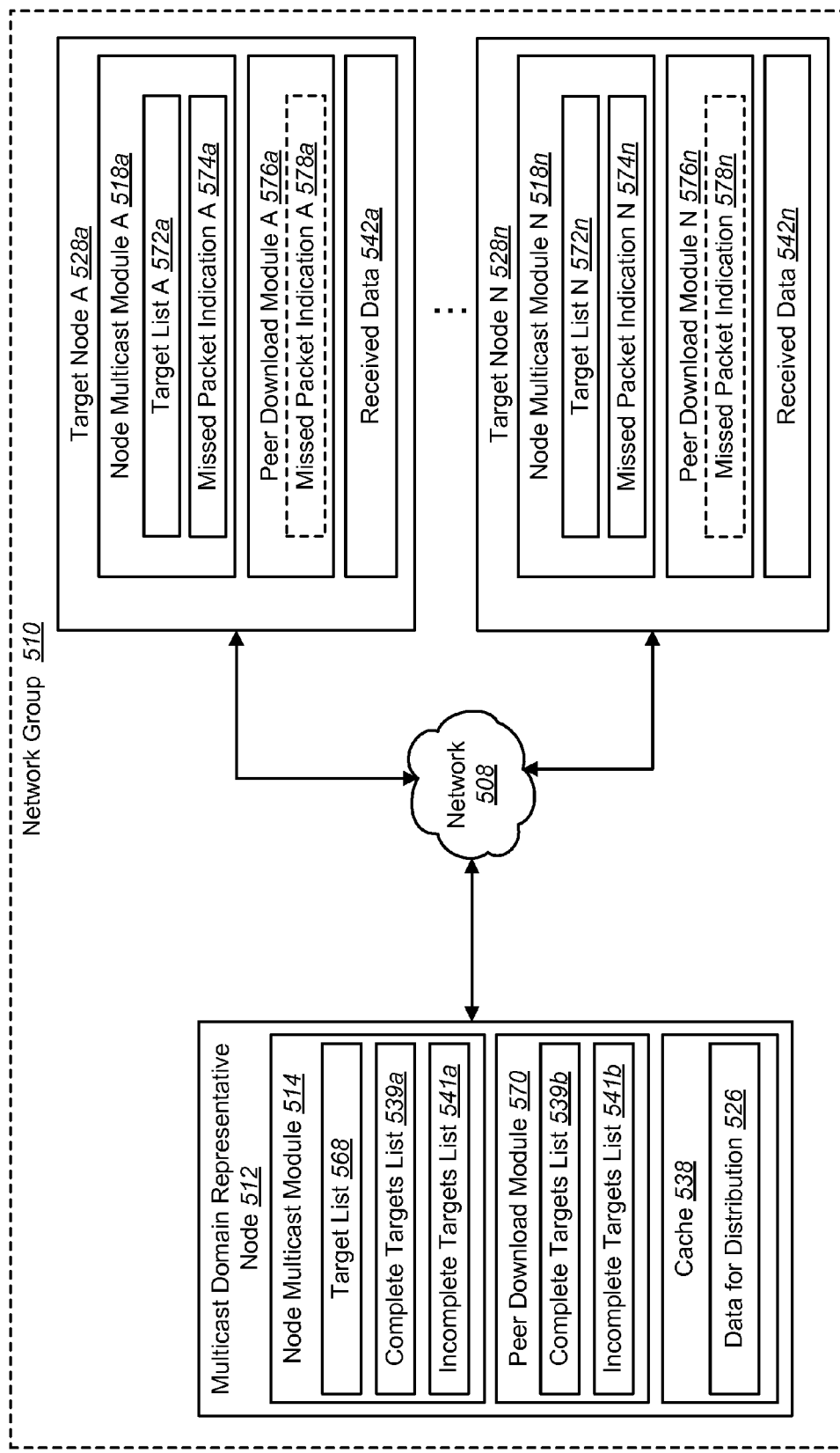
FIG. 5 is a block diagram illustrating another configuration of nodes in which systems and methods for retransmitting lost packets for multicast data distribution may be implemented.

FIG. 5 is a block diagram illustrating another configuration of nodes 512, 528a-n in which systems and methods for retransmitting lost packets for multicast data distribution may be implemented. In this configuration, a network group 510 may include a multicast domain representative node 512 and several target nodes 528a-n. The multicast domain representative node 512 and the target nodes 528a-n may communicate with each other via the network 508. The multicast domain representative node 512 may include a peer download or completion module 570 in addition to a node multicast module 514 and a cache 538. In one configuration, for example, the peer download or completion module 570 may be included in the node multicast module 514. The node multicast module 514 may include a target list 568. The target list 568 may include information about which nodes in the network group 510 are target nodes 528a-n. For example, the target list 568 may include a node name and/or network address for each target node 528a-n.

Each of the target nodes 528a-n may also include a peer download or completion module 576a-n. The peer download or completion modules 570, 576a-n may provide peer download or completion functionality. That is, the peer download modules 570, 576a-n may allow any node 512, 528a-n in the network group 510 to download data from any other "peer" node 512, 528a-n in the network group 510. For example, a peer download or completion module 576 may allow a target node 528 of a multicast job to contact another target node 528 of the same multicast job (that received all of the data for distribution 526, for example) to obtain one or more missing packets. It should be noted that this peer download or completion module 576 may be distinguished from other "peer download" technology that is unrelated to multicast jobs.

The multicast domain representative node 512 may receive the data for distribution 526 from the administrative system 102 as discussed earlier. The multicast domain representative node 512 may multicast the data for distribution 526 to all of the target nodes 528a-n using the target list 568, for example. The multicast domain representative node 512 may not receive or accept any retransmission requests during the initial multicast. Similar to the configuration described above in connection with FIG. 3, data for distribution 526 may be located in the cache 526 (e.g., cache directory) of the multicast domain representative node 512. The data for distribution 526 may be located in the cache 538 as a result of the multicast domain representative node 512 completing a multicast transmission. Locating the data for distribution 526 in the cache 538 may provide a benefit of faster data access, and hence, faster data transmission or retransmission.

When the multicast domain representative node 512 has finished the initial multicast, it may send an instruction to each of the "incomplete" target nodes 528a-n (or target nodes 528 that have not received all of the data for distribution 526) to perform a peer download or completion operation. The multicast domain representative node 512 may also send the target list 568 to the target nodes 528a-n. The target nodes 528a-n may receive and/or store the target list 572a-n. The target nodes 528a-n may use the target list 572a-n to determine that they are targets of a multicast job, for example.

After the initial multicast of the data for distribution 526, the multicast domain representative node 512 may have the entire file in its cache 538 directory. Thus, at least one node on the subnet or multicast domain has all of the data for distribution 526 (e.g., the complete file or files). The multicast domain representative node 512 may also have a list of target nodes 528. During and/or after the initial multicast transmission, the target nodes 528a-n may determine which packets, if any, have been missed. The target nodes 528a-n may store this information about missed packets 574a-n. In one configuration, the node multicast modules 518a-n may record the missed packets 574a-n. In addition or alternatively, the peer download modules 576a-n may record the missed packets 578a-n. For example, a binary map may be used as discussed above to indicate whether there are any missing packets remaining.

The multicast domain representative node 512 may send a message via multicast to all of the target nodes 528 of the multicast job that requests an indication of how many packets each of the target nodes 528 is missing. Each of the target nodes 528 may send a missed packet indication 574a-n, 578a-n that indicates how many packets that target node 528 has missed. The missed packet indication 574a-n, 578a-n may be different from a missed packet request (e.g., a missed packet list 340), since the missed packet indication 574a-n, 578*a-n* may only contain a single number indicating how many packets are missing, for example. It should be noted that the missed packet indication 574*a-n*, 578*a-n* may be generated and/or maintained by the node multicast module 518, the peer download module 576 or both, depending on the configuration.

For example, a missed packet indication 574, 578 of zero means that a target node 528 has all of the data for distribution 526 (e.g., the entire file or files). As the missed packet indications 574, 578 are received via point-to-point messages (e.g., via User Datagram Protocol (UDP)), the multicast domain representative node 512 may maintain two lists of target nodes 528: a list 539*a-b* of "complete" target nodes 528 that have all of the data for distribution 526 (the multicast domain representative node 512 may keep itself 512 on this list because it 512 has all of the data for distribution 526) and a list 541*a-b* of "incomplete" target nodes 528 that did not receive all of the data for distribution 526. As illustrated in FIG. 5, the complete targets list 539*a-b* and/or incomplete targets list 541*a-b* may be included in the node multicast module 514 and/or the peer download module 570, depending on the configuration.

After the multicast domain representative node 512 has waited a sufficient time for the missed packet indication(s) 574, 578 to be received, it 512 has the complete targets list 539 indicating which of the target nodes 528 have all of the data for distribution 526 and the incomplete targets list 541 which of the target nodes 528 do not have all of the data for distribution 526. The multicast domain representative node 512 may then send an instruction to each of the "incomplete" target nodes 528 (which do not have all of the data for distribution 526) to connect to a "complete" target node 528 (that has all of the data for distribution 526). That is, the target nodes 528 may connect to peers when they receive an instruction to connect to peers from the multicast domain representative node 512, which has information indicating which target nodes 528 are "complete" (e.g., have all of the data for distribution 526) and which target nodes 528 are "incomplete" (e.g., do not have all of the data for distribution 526). The incomplete target nodes 528 may then connect to their "peers" in the network group 510 and send a missed packet request. For example, this peer connection may use the Transmission Control Protocol (TCP), which is a connection-based protocol. The missed packet request may include an indication of specific missing packets (e.g., a specific list of the missing packets). In one configuration, the missed packet request is sent over a TCP connection. The peer target node 528 may then reply with the data (e.g., packets) that was requested using the TCP connection. In one configuration, the TCP may handle any further missed packets, retransmission requests, re-ordering of packets, etc.

One example of the systems and methods disclosed herein follows. If there are five complete target nodes 528 and 15 incomplete target nodes 528, for example, the multicast domain representative node 512 may send messages to five of the incomplete target nodes 528, instructing each of them to connect to one of the complete target nodes 528. For peer completion efficiency, the target nodes 528 that are missing the fewest packets may be instructed to connect (or be allocated connections) first. In this way, more complete target nodes 528 become available to help incomplete target nodes 528 as soon as possible.

It should be noted that the multicast domain representative node 512 may have the corresponding Internet Protocol (IP) address saved from each missed packet indication 578. The IP address may be used to instruct each incomplete target node 528 regarding which complete target node 528 they should connect to. The multicast domain representative node 512 may only allow a single connection to a complete target node 528 that has all of the data for distribution 526. Thus, it 512 may only initially instruct five target nodes 528 to complete or download the data for distribution 526 from a peer target node 528. As the first five target nodes 528 that connected to a peer target node 528 (using a Transmission Control Protocol (TCP) connection, guaranteed delivery, etc.) complete receiving the data for distribution 526, they 528 may send a missed packet indication 574, 578 to the multicast representative node 512 indicating that they are now missing zero packets. These "completed" target nodes 528 are now added to the "completed" targets list 539*a-b* and are available for an "incomplete" target node 528 to connect to. Thus, after the five incomplete target nodes 528 receive the missing packets from the five complete target nodes 528, there are possibly up to 10 available complete target nodes 528. The multicast representative node 512 may then instruct the remaining 10 incomplete target nodes 528 to each connect to one of the complete target nodes 528 to download or complete missing data.

It should be noted that the network group 510 peers may include the multicast domain representative node 512 and other target nodes 528*a-n* (e.g., besides the target node at hand that has missed packets). Because the multicast domain representative node 512 initially distributed the data for distribution, it is "guaranteed" that at least one of the nodes in the network group 510 (i.e., itself) has all of the data for distribution 526. It should also be noted that a unique identifier (e.g., a Globally Unique Identifier) may be used that is created for each multicast job. This identifier may be included on target list, file information, file data, missed packet indication and other messages related to the multicast job.

Figure 6:
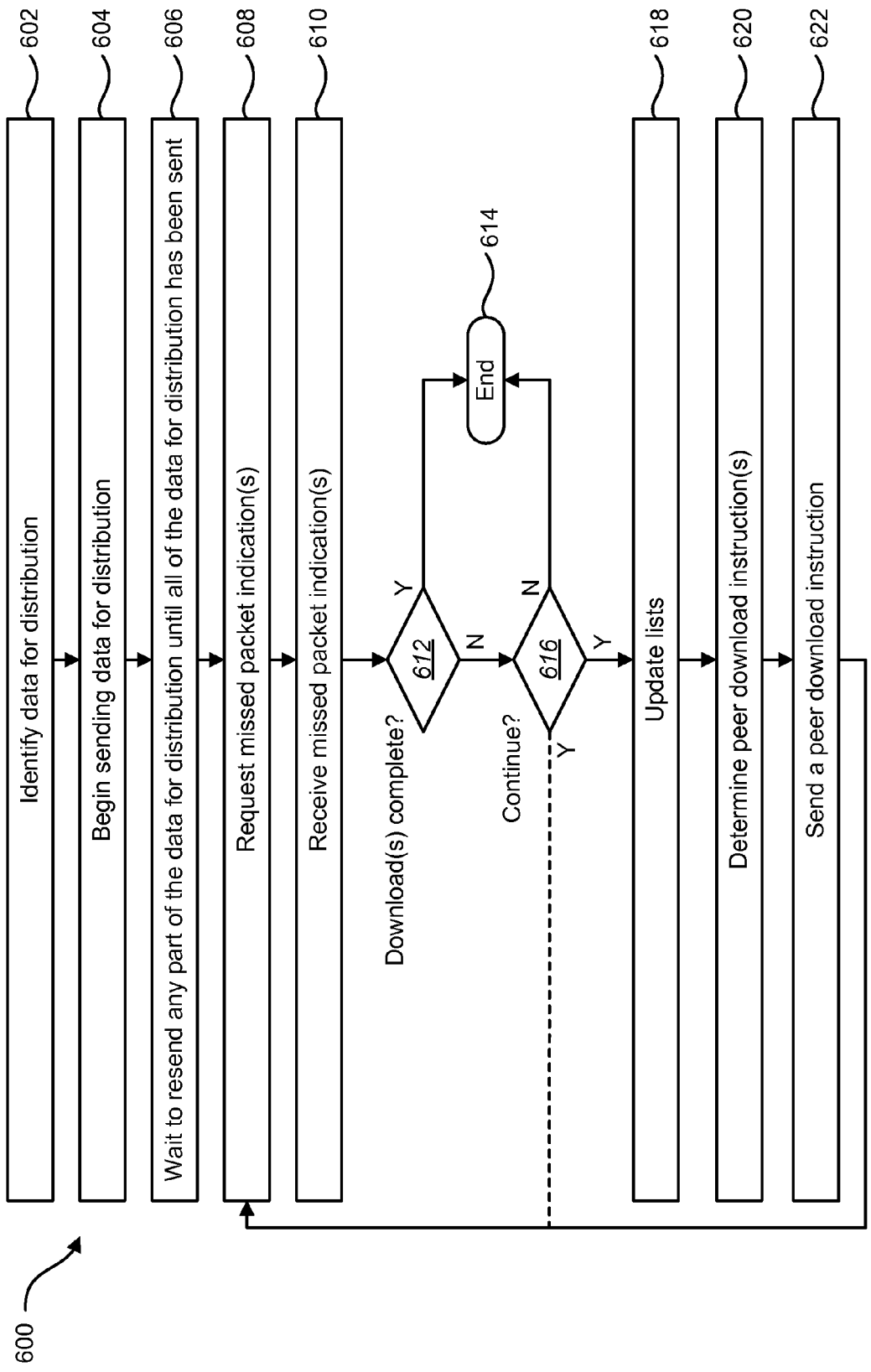
FIG. 6 is a flow diagram illustrating another configuration of a method for retransmitting lost packets for multicast data distribution.

FIG. 6 is a flow diagram illustrating another configuration of a method 600 for retransmitting lost packets for multicast data distribution. The multicast domain representative node 512 may identify 602 data for distribution 526. For example, the multicast domain representative node 512 receives data for distribution 526 from the administrative system 102. In an alternative configuration, the multicast domain representative node 512 has data for distribution 526 that is scheduled to be distributed at a certain time. The multicast domain representative node 512 may then begin sending 604 the data for distribution 526 via multicast to the target nodes 528*a-n*. The multicast domain representative node 512 waits 606 to resend any part of the data for distribution 526 until all of the data for distribution 526 has been sent.

Once all of the data for distribution 526 has been sent, the multicast domain representative node 512 may request 608 missed packet indications 547, 578 from the target nodes 528. Each of the target nodes 528 may send a missed packet indication 547, 578 to the multicast domain representative 512. In one configuration, the missed packet indication 547, 578 is a number indicating how many packets the corresponding target node 528 is missing. The multicast domain representative 512 may receive 610 the missed packet indication 547, 578 from each target node 528. In one configuration, the multicast domain representative 512 uses the missed packet indication 547, 578 to prioritize or sort which target nodes 528 should be allocated or assigned a connection to a complete target node 528 for peer download or completion. For example, the incomplete target nodes 528 missing the fewest packets may be given a connection first. In this way, incomplete target nodes 528 may be transitioned to complete target nodes 528 more quickly. This may allow faster completion for the target nodes 528 in general.

The multicast domain representative node 512 may determine 612 if the peer download(s) are complete. For example, if all of the received 610 missed packet indications 574, 578 indicate that none of the target nodes 528 are missing any packets (e.g., all of their missed packet indications are zero), the operation or multicast job may end 614. However, if the multicast domain representative node 512 determines 612 that not all of the peer downloads are complete, then the multicast domain representative node 512 may determine 616 whether to continue. For example, if the received 610 missed packet indications 574, 578 show that no progress is being made (e.g., after a number of iterations or repetitions), then operation may end 614. For instance, the multicast domain representative node 512 may compare the most recently received 610 missed packet indications 574, 578 to missed packet indications 574, 578 received earlier. If the number or numbers given by the missed packet indications 574, 578 are the same as the number or numbers given by one or more (e.g., the last four) previous missed packet indications 574, 578, the multicast domain representative node 512 may determine 616 not to continue, as this may indicate that no more progress is being made in the multicast job. Thus, operation may end 614.

In one configuration, this determination 616 may be based on an amount of time or a number of missed packet indications 574, 578 that are the same. For example, the multicast domain representative node 512 may have a threshold number of missed packet indications 574, 578 that can be the same before determining 616 that operation should end 614. For instance, if the threshold is 4 missed packet indications 574, 578, the multicast domain representative node 512 may determine whether the most recent received missed packet indications 574, 578 are the same as previous missed packet indications 574, 578. The first time that they are the same, the multicast domain representative node 512 may determine 616 to continue, thus returning to request 608 missed packet indications 574, 578. The multicast domain representative node 512 may similarly determine 616 to continue on the second and third times that the missed packet indications 574, 578 are the same. However, if the missed packet indications 574, 578 are the same the fourth time, the multicast domain representative node 512 may determine 616 not to continue, and operation may end 614. In another configuration, this determination 616 may be based on an amount of time. In other words, if the received 610 missed packet indications 574, 578 are the same after an amount of time, operation may end 614. Otherwise, if the received 610 missed packet indications 574, 578 are the same within the amount of time, operation may continue by returning to request 608 missed packet indications. It should be noted that in some configurations, the multicast domain representative node 512 may wait an amount of time before requesting 608 missed packet indications 608 after determining 616 to continue.

In one configuration, if the number of missed packet indications 574, 578 are not the same as the previous missed packet indications 574, 578, indicating that progress is being made, the multicast domain representative node 512 may determine 616 to continue. The multicast domain representative node 512 may then update 618 lists. For example, the multicast domain representative node 512 may update 618 its complete targets list 539a-b and/or its incomplete targets list 541a-b. For instance, if the multicast domain representative node 512 has received 610 a missed packet indication 574, 578 indicating zero missing packets from a target node 528 that was "incomplete" (e.g., is on the incomplete targets list 541a-b and/or had not received all of the data for distribution 526 before), the multicast domain representative node 512 may put that target node 528 on the complete targets list 539a-b and/or remove it from the incomplete targets list 541a-b. In summary, the multicast domain representative node 512 may update 618 the complete targets list 539a-b by adding target nodes 528 that have completed the download (with a missed packet indication 574, 578 of zero, for example). It may additionally or alternatively update the incomplete targets list 541a-b by adding (initially, for example) target nodes 528 that have not completed the download (with a missed packet indication 574, 578 of one or more missed packets) and/or by removing target nodes 528 that have completed the download (with a missed packet indication 574, 578 of zero, for example).

In one configuration, for example, while the multicast domain representative node 512 is in the peer completion state, it 512 periodically sends 608 requests for how many packets are missing from each target node 528. It 512 may add the missed number for each target node 528 (from the received 610 missed packet indications 574, 578) to come up with a total number of missed packets. As long as that number is changing, it 512 knows progress is still being made and may thus determine 616 to continue. Otherwise, it 512 may determine 616 that the multicast job is done by that number not changing for a given amount of time. For example, the multicast domain representative node 512 may check every 2 seconds and if the number stays at the same value for 4 checks, it 512 determines 616 that it is time to not continue or give up. This procedure may be beneficial in case some target node 528 got stuck or something went wrong, the multicast domain representative node 512 would not stick around forever waiting for that last target node 528 to finish downloading. In general, if it appears progress has stopped, the multicast domain representative node 512 uses some procedure to determine it is time to give up.

The multicast domain representative node 512 may determine 620 peer download instructions. For example, the multicast domain representative node 512 may use the complete targets list 539a-b and the incomplete targets list 541a-b to determine 620 which "incomplete" target nodes 528 should connect to which "complete" target nodes 528 in order to finish the peer download or completion. Incomplete target nodes 528 with the fewest missed packets may take priority over incomplete target nodes 528 with more missed packets. The multicast domain representative node 512 may additionally or alternatively use the IP addresses of the complete target nodes 528 (indicated from the received 610 missed packet indications, for example) in determining 620 peer download instructions. For example, (prioritized) incomplete target nodes 528 may be assigned the IP address of a complete target node 528 for peer download completion.

The multicast domain representative node 512 may send 622 a peer download instruction. For example, the multicast domain representative node 512 may send 622 a peer download instruction to each of the incomplete target nodes 528 indicating that each incomplete target node 528 should obtain missing packets (of the data for distribution 526) from complete target nodes 528. The peer download instruction may additionally or alternatively include an address (e.g., IP address) of a complete target node 528 the incomplete target node 528 should connect (e.g., using a TCP connection) to in order to obtain the missing packets. The multicast domain representative node 512 may then return to request missed packet indications 608. In some configurations, the multicast domain representative node 512 may wait for an amount of time after sending 622 a peer download instruction before returning to request 608 missed packet indications.

It should be noted that when the procedure ends 614, alternative or additional operations may be used. In one configuration, for example, the multicast domain representative node 512 may send a report to the administrative system 102, indicating which target nodes 528 did not complete the data download and/or reasons why. In another configuration, the multicast domain representative node 512 may send another instruction to the target nodes 528 to run or install an application (e.g., from the multicast job, for example).

Figure 7:
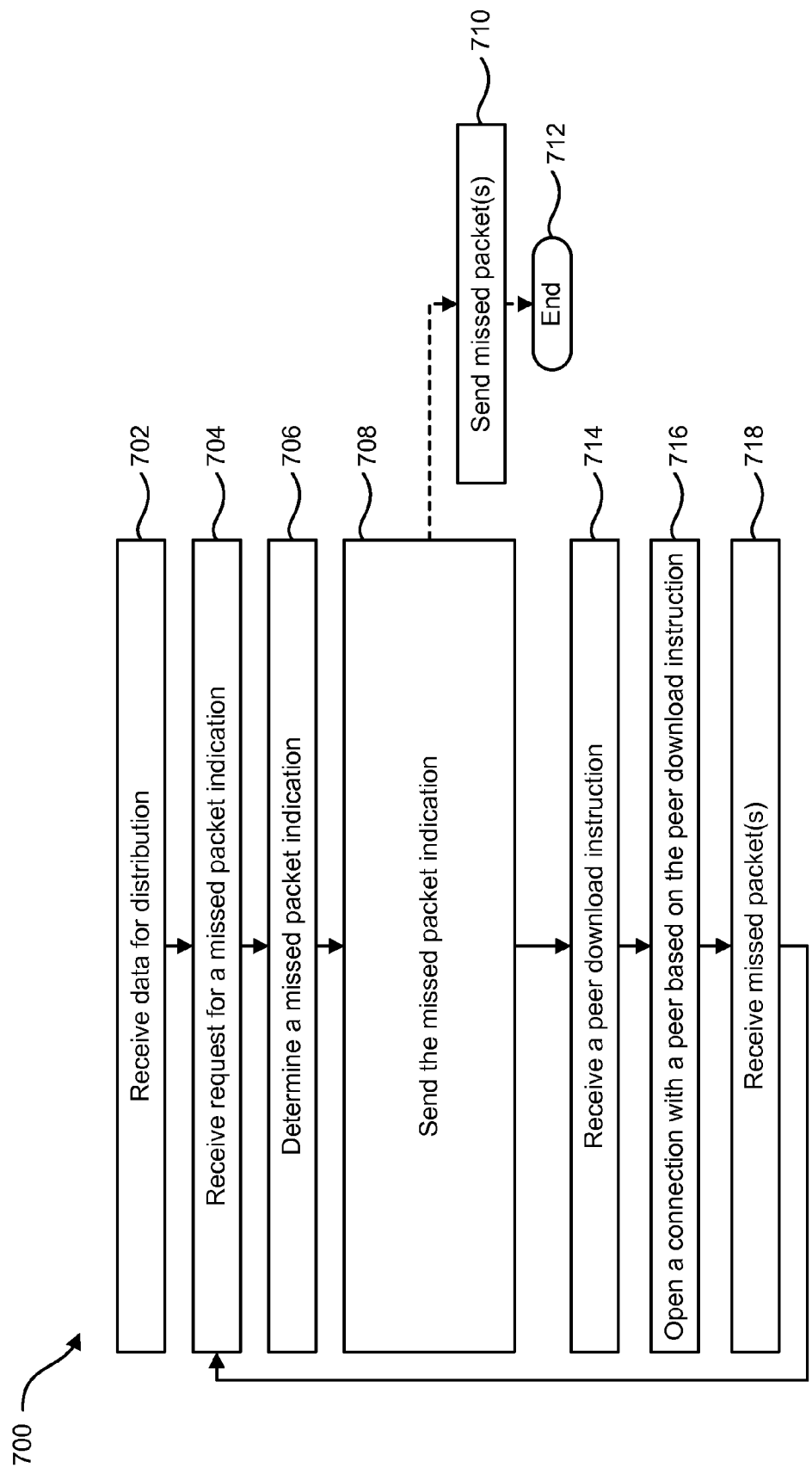
FIG. 7 is a flow diagram illustrating another configuration of a method for retransmitting lost packets for multicast data distribution.

FIG. 7 is a flow diagram illustrating another method 700 for retransmitting lost packets for multicast data distribution. A target node 528 may receive 702 some or all data for distribution 526 (via multicast, for example). The target node 528 may receive 704 a request for a missed packet indication 574, 578 (from the multicast domain representative node 512, for example). The target node 528 may determine 706 a missed packet indication 574, 578. For example, the target node 528 may use packet numbers and other information regarding the amount of data for distribution 526 (e.g., file size) to determine how many packets were missed. The target node 528 may send 708 the missed packet indication 574, 578. For example, the target node 528 may send 708 a missed packet indication 574, 578 including the determined 706 number of missed packets to the multicast representative node 512.

In the case where the number of missed packets is zero, the target node 528 may additionally or alternatively send 710 missed packets. For example, when the target node 528 has zero missing packets, the target node 528 may be considered a "complete" target node 528, having all of the data for distribution. The complete target node 528 may receive requests from other target nodes 528 requesting a peer download of their missed packets. The complete target node 528 may send 710 the requested missed packets to an incomplete target node 528 using a TCP connection, for example. After sending missed packets or if the target node 528 does not receive any requests for missed packets, operation may end 712. It should be noted, however, that in a case where the target node 528 has not received all of the missed packets, but has been unable to make further progress (e.g., a network connection has been lost, the target node 528 has shut down, etc.), operation may also end 712. Additionally or alternatively, the target node 528 may send a report to the multicast domain representative node 528 any known reason for failure to download the missing packets.

In the case where the number of missed packets is greater than zero, the target node 528 may receive 714 a peer download instruction. For example, the multicast domain representative node 512 may send a peer download instruction, indicating which other target node 528 or "peer" the target node should seek to download missing packets from. For example, the peer download instruction may include an IP address of a "complete" target node 528 (that has all of the data for distribution). The target node 528 may open 716 a connection with a peer based on the peer download instruction. For example, the target node 528 may use the peer download instruction (with the IP address, for example) to request a TCP connection with another complete target node 528. It should be noted that if the connection with the peer has already been established, the target node 528 may continue to use the same connection. The target node 528 may then receive 718 missed packets. For example, the incomplete target node 528 may receive 718 requested missed packets from a complete target node 528 or peer. Operation may return to receiving 704 a request for a missed packet indication. It should be noted that if the target node 528 is unable to open 716 a connection with the assigned peer and/or is unable to receive 718 packets from the peer (the peer may have shut down or lost a network connection, etc., for example), the target node 528 may send a message to the multicast representative node 512 indicating that it is no longer communicating with the peer (and drop out of the connection, for example). The multicast representative node 512 may put the target node 528 back into the incomplete list 541*a-b* and/or assign it to a different peer when one becomes available.

Figure 8:
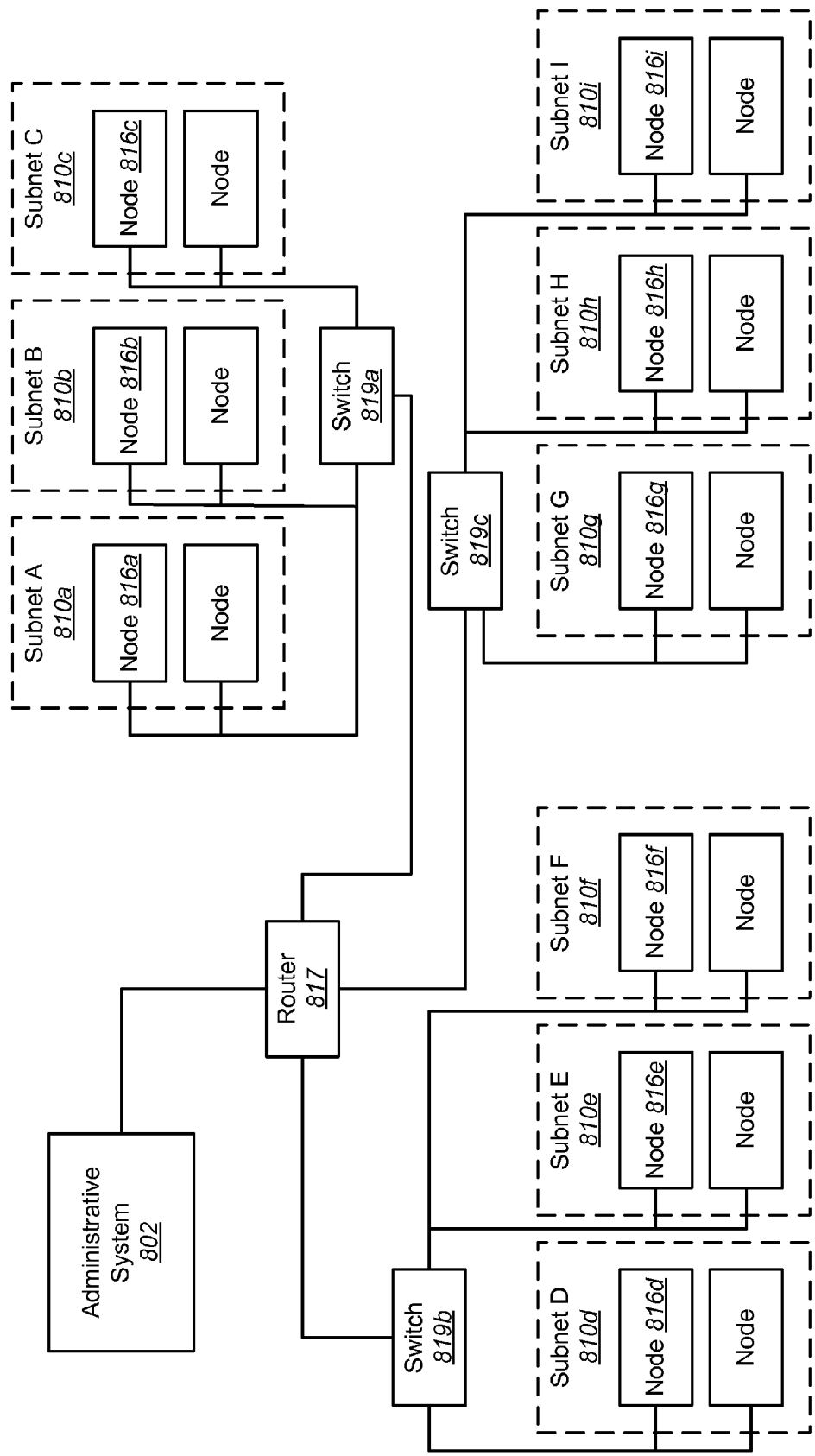
FIG. 8 is a block diagram that illustrates one configuration of a network where a system for retransmitting lost packets for multicast data distribution may be implemented.

FIG. 8 is a block diagram that illustrates one configuration of a network where a system for retransmitting lost packets for multicast data distribution may be implemented. An administrative system 802 is connected to a router 817. The router 817 is connected to switches 819*a*, 819*b*, 819*c*. The switch 819*a* is connected to several nodes 816*a*, 816*b*, 816*c*, etc. via their respective subnets 810*a*, 810*b*, 810*c*. The switch 819*b* is connected to several nodes 816*d*, 816*e*, 816*f*, etc. via their respective subnets 810*d*, 810*e*, 810*f*. The switch 819*c* is connected to several nodes 816*g*, 816*h*, 816*i*, etc. via their respective subnets 810*g*, 810*h*, 810*i*. Although FIG. 8 only shows one router 817, and a limited number of switches 819, subnets 810 and nodes 816, many and varied numbers of routers 817, switches 819, subnets 810 and nodes 816 may be included in networks and/or systems where a system for retransmitting lost packets for multicast data distribution may be implemented.

Figure 9:
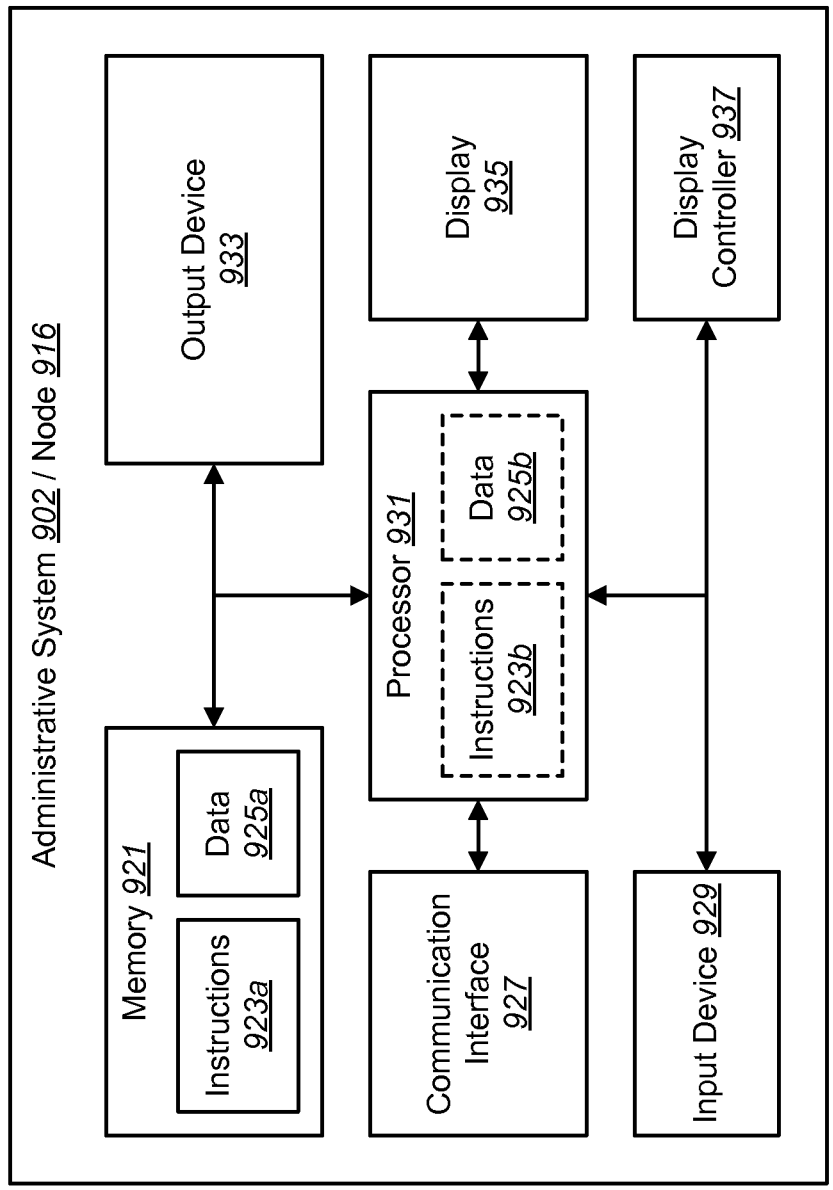
FIG. 9 illustrates various components that may be utilized in an administrative system and/or a node.

FIG. 9 illustrates various components that may be utilized in an administrative system 902 and/or a node 916. The illustrated components may be located within the same physical structure or in separate housings or structures.

The administrative system 902 and/or node 916 may include a processor 931 and memory 921. The memory 921 may include instructions 923*a* and data 925*a*. The processor 931 controls the operation of the administrative system 902 and/or node 916 and may be, for example, a microprocessor, a microcontroller, a digital signal processor (DSP) or other device known in the art. The processor 931 typically performs logical and arithmetic operations based on program instructions 923*b* and/or data 925*b* it loads from the memory 921.

The administrative system 902 and/or node 916 typically may include one or more communication interfaces 927 for communicating with other electronic devices. The communication interfaces 927 may be based on wired communication technology, wireless communication technology, or both. Examples of different types of communication interfaces 927 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The administrative system 902 and/or node 916 typically may include one or more input devices 929 and one or more output devices 933. Examples of different kinds of input devices 929 include a keyboard, mouse, microphone, remote control device, button, joystick, trackball, touchpad, lightpen, etc. Examples of different kinds of output devices 933 include a speaker, printer, etc. One specific type of output device that may be typically included in a computer system is a display device 935. Display devices 935 used with configurations disclosed herein may utilize any suitable image projection technology, such as a cathode ray tube (CRT), liquid crystal display (LCD), light-emitting diode (LED), gas plasma, electroluminescence or the like. A display controller 937 may also be provided, for converting data stored in the memory 921 into text, graphics and/or moving images (as appropriate) shown on the display device 935.

Of course, FIG. 9 illustrates only one possible configuration of an administrative system 902 and/or node 916. Various other architectures and components may be utilized.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The term "computer-readable medium" refers to any available medium that can be accessed by a computer or processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be non-transitory and tangible.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A computing device that is configured for retransmitting lost packets for multicast data distribution from a computing device, comprising:
 a processor;
 memory in electronic communication with the processor;
 instructions stored in the memory, the instructions being executable to:
  identify data for distribution to be distributed via a computer network to a plurality of computing devices, wherein the data for distribution comprises software files including an operating system update;
  begin sending the data for distribution via multicast;
  wait to resend any part of the data for distribution until all of the data for distribution has been sent;
  send a request for missed packet lists;
  wait for replies to the request for the missed packet lists;
  add missed packets to a map if there are replies to the request for missed packet lists;
  determine whether there are any missed packets;
  resend the missed packets if there are any missed packets;
  determine whether to repeat operation if there are any missed packets; and
  return to send requests for missed packet lists if it is determined to repeat operation.

2. The computing device of claim 1, wherein the instructions are further executable to:
 request one or more status messages if there are no missed packets;
 wait to receive one or more status messages if there are no missed packets; and
 send the status messages if there are no missed packets.

3. The computing device of claim 1, wherein the instructions are further executable to return to send a request for missed packet lists after resending the missed packets.

4. The computing device of claim 1, wherein determining whether to repeat operation is based on a fixed number of repeats.

5. The computing device of claim 1, wherein determining whether to repeat operation is based on a time limit.

6. The computing device of claim 1, wherein the instructions are further executable to:
 request one or more status messages if it is determined to not repeat operation;
 wait to receive one or more status messages if it is determined not to repeat operation; and send the status messages if it is determined not to repeat operation.

7. The computing device of claim 1, wherein determining whether there are any missed packets is based on whether at least one missed packet list is received by the computing device.

8. A computing device that is configured for retransmitting lost packets for multicast data distribution from a computing device, comprising:
- a processor;
- memory in electronic communication with the processor;
- instructions stored in the memory, the instructions being executable to:
  - identify data for distribution to be distributed via a computer network to a plurality of computing devices, wherein the data for distribution comprises software files including an operating system update;
  - begin sending the data for distribution via multicast;
  - wait to resend any part of the data for distribution until all of the data for distribution has been sent;
  - request a missed packet indication;
  - receive a missed packet indication;
  - determine whether to continue based on a number of same missed packet indications;
  - update a list of complete target nodes;
  - update a list of incomplete target nodes;
  - determine a peer download instruction; and
  - send a peer download instruction.

9. The computing device of claim 8, wherein the peer download instruction comprises an instruction for an incomplete target node to connect to a designated complete target node to obtain at least one missing packet.

10. The computing device of claim 8, wherein the peer download instruction comprises an address of a designated complete target node.

11. The computing device of claim 8, wherein the missed packet indication comprises a number of missed packets.

12. The computing device of claim 8, wherein updating the list of complete target nodes comprises adding a target node to the list corresponding to a missed packet indication of zero packets.

13. The computing device of claim 8, wherein updating the list of incomplete target nodes comprises adding a target node to the list corresponding to a missed packet indication of one or more packets.

14. The computing device of claim 8, wherein updating the list of incomplete target nodes comprises removing a target node from the list corresponding to a missed packet indication of zero packets.

15. A method for retransmitting lost packets for multicast data distribution from a computing device, comprising:
- identifying data for distribution to be distributed via a computer network to a plurality of computing devices, wherein the data for distribution comprises software files including an operating system update;
- beginning to send the data for distribution from a computing device via multicast;
- waiting, on the computing device, to resend any part of the data for distribution until all of the data for distribution has been sent;
- sending a request for missed packet lists;
- waiting for replies to the request for the missed packet lists;
- adding, on the computing device, missed packets to a map if there are replies to the request for missed packet lists;
- determining, on the computing device, whether there are any missed packets;
- resending the missed packets if there are any missed packets;
- determining whether to repeat operation if there are any missed packets; and
- returning to send requests for missed packet lists if it is determined to repeat operation.

16. The method of claim 15, further comprising:
- requesting one or more status messages if there are no missed packets;
- waiting to receive one or more status messages if there are no missed packets; and
- sending the status messages if there are no missed packets.

17. The method of claim 15, further comprising returning to send a request for missed packet lists after resending the missed packets.

18. The method of claim 15, wherein determining whether to repeat operation is based on a fixed number of repeats.

19. The method of claim 15, wherein determining whether to repeat operation is based on a time limit.

20. The method of claim 15, further comprising:
- requesting one or more status messages if it is determined to not repeat operation;
- waiting to receive one or more status messages if it is determined not to repeat operation; and
- sending the status messages if it is determined not to repeat operation.

21. The method of claim 15, wherein determining whether there are any missed packets is based on whether at least one missed packet list is received by the computing device.

22. A method that is configured for retransmitting lost packets for multicast data distribution from a computing device, comprising:
- identifying data for distribution to be distributed via a computer network to a plurality of computing devices, wherein the data for distribution comprises software files including an operating system update;
- beginning to send the data for distribution via multicast;
- waiting, on the computing device, to resend any part of the data for distribution until all of the data for distribution has been sent;
- requesting a missed packet indication;
- receiving a missed packet indication;
- determining whether to continue based on a number of same missed packet indications;
- updating, on the computing device, a list of complete target nodes;
- updating, on the computing device, a list of incomplete target nodes;
- determining a peer download instruction; and
- sending a peer download instruction.

23. The method of claim 22, wherein the peer download instruction comprises an instruction for an incomplete target node to connect to a designated complete target node to obtain at least one missing packet.

24. The method of claim 22, wherein the peer download instruction comprises an address of a designated complete target node.

25. The method of claim 22, wherein the missed packet indication comprises a number of missed packets.

26. The method of claim 22, wherein updating the list of complete target nodes comprises adding a target node to the list corresponding to a missed packet indication of zero packets.

27. The method of claim 22, wherein updating the list of incomplete target nodes comprises adding a target node to the list corresponding to a missed packet indication of one or more packets.

28. The method of claim 22, wherein updating the list of incomplete target nodes comprises removing a target node from the list corresponding to a missed packet indication of zero packets.

29. A non-transitory tangible computer-readable medium for retransmitting lost packets for multicast data distribution on a computing device comprising executable instructions for:
- identifying data for distribution to be distributed via a computer network to a plurality of computing devices, wherein the data for distribution comprises software files including an operating system update;
- beginning to send the data for distribution via multicast;
- waiting to resend any part of the data for distribution until all of the data for distribution has been sent;
- sending a request for missed packet lists;
- waiting for replies to the request for the missed packet lists;
- adding missed packets to a map if there are replies to the request for missed packet lists;
- determining whether there are any missed packets;
- resending the missed packets if there are any missed packets;
- determining whether to repeat operation if there are any missed packets; and
- returning to send requests for missed packet lists if it is determined to repeat operation.

30. A non-transitory tangible computer-readable medium for retransmitting lost packets for multicast data distribution from a computing device, comprising executable instructions for:
- identifying data for distribution to be distributed via a computer network to a plurality of computing devices, wherein the data for distribution comprises software files including an operating system update;
- beginning to send the data for distribution via multicast;
- waiting to resend any part of the data for distribution until all of the data for distribution has been sent;
- requesting a missed packet indication;
- receiving a missed packet indication;
- determining whether to continue based on a number of same missed packet indications;
- updating a list of complete target nodes;
- updating a list of incomplete target nodes;
- determining a peer download instruction; and
- sending a peer download instruction.

* * * * *